United States Patent
Nygard et al.

(10) Patent No.: US 6,437,476 B1
(45) Date of Patent: Aug. 20, 2002

(54) MULTI-POLE ELECTRIC MACHINE INCLUDING FLAT WINDING FOR GENERATOR FIELDS

(75) Inventors: Robert John Nygard, Saratoga Springs; Christopher Anthony Kaminski, Niskayuna; Yu Wang, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/590,176

(22) Filed: Jun. 9, 2000

Related U.S. Application Data
(60) Provisional application No. 60/169,240, filed on Dec. 6, 1999.

(51) Int. Cl.[7] .............................. H02K 3/46; H02K 3/52
(52) U.S. Cl. ........................ 310/261; 310/208; 310/195; 310/264
(58) Field of Search .................................. 310/261, 195, 310/203, 208, 262, 264, 265, 266, 268, 269

(56) References Cited

U.S. PATENT DOCUMENTS

| | | | | |
|---|---|---|---|---|
| 428,289 A | * | 5/1890 | Schmid | 310/269 |
| 2,295,019 A | * | 8/1942 | Thompson | 188/104 |
| 4,591,751 A | * | 5/1986 | Ono | 310/208 |
| 4,614,888 A | * | 9/1986 | Mosher et al. | 310/261 |
| 5,323,080 A | * | 6/1994 | Shahamat et al. | 310/261 |
| 6,169,353 B1 | * | 1/2001 | Driscoll et al. | 310/261 |

OTHER PUBLICATIONS

"Non–Metallic Structural Rotor Enclosure," Y. Wang et al., Ser. No. 09/491,504 (GE docket RD–26,523), filed Jan. 26, 2000.

* cited by examiner

*Primary Examiner*—Burton S. Mullins
(74) *Attorney, Agent, or Firm*—Enrique Abarca; Donald S. Ingraham

(57) ABSTRACT

A generator rotor includes a rotor body having defined pole regions with pole faces and parallel sides adjacent the pole faces. A winding module is fitted over the parallel sides of the rotor body, and a pair of spindles are secured to respective ends of the rotor body. The spindles secure opposite sides of the winding module to the rotor body. The spindles preferably include a notch that is shaped to receive one side, respectively, of the winding module. With this construction, flat windings can be used for the winding module, eliminating the need for a curved module to fit over the spindle.

13 Claims, 1 Drawing Sheet

MULTI-POLE ELECTRIC MACHINE INCLUDING FLAT WINDING FOR GENERATOR FIELDS

This application claims the benefit of U.S. Provisional Patent Application Ser. No. 60/169,240, filed Dec. 6, 1999, the entire content of which is herein incorporated by reference.

BACKGROUND OF THE INVENTION

The present invention relates to electric machines and, more particularly, to a multi-piece generator rotor including flat windings for generator fields.

In a conventional generator having a rotor and a stator, the rotor is provided with field windings that excite the generator while receiving a current from an exciting current source. The stator is provided with armature windings from which electrical power is obtained.

The rotor is typically provided with rotor spindles to effect rotation. With this structure, however, the spindles on each end of the rotor body require at least two sides of the field winding to be formed into an arc concentric with the spindle. This rotor construction including a one-piece rotor forging and end winding modules having curved ends is described in copending U.S. patent application Ser. No. 09/491,504, filed Jan. 26, 2000.

It would be desirable, for simplicity of manufacturing, to be able to flatten the curved sides of the prior end winding modules and thereby eliminate the need to form the arcs required for concentricity with the spindle.

BRIEF SUMMARY OF THE INVENTION

In an exemplary embodiment of the invention, a multi-pole electric machine rotor includes a rotor body having poles with defined pole faces and parallel sides adjacent to the pole faces, a winding module that fits over the parallel sides of the poles, and a pair of spindles secured to respective ends of the rotor body and holding sides of the winding module to the rotor body. The spindles are preferably secured to the rotor body with bolts or threaded studs. Each of the spindles is provided with a notch shaped to receive one side of the winding module. In a preferred embodiment, the winding module includes a plurality of abutting flat field windings joined end-to-end and having openings sized to fit over the rotor body. The flat field windings may have a smaller perimeter at outside ends of the winding module that taper toward a largest perimeter at the middle of the winding module.

In another exemplary embodiment of the invention, a multi-pole electric machine includes a stator and the rotor of the present invention.

In still another exemplary embodiment of the invention, a method of constructing a generator rotor includes the steps of providing a rotor body having pole regions with defined pole faces and having parallel sides adjacent to the pole faces, fitting a winding module over the parallel sides of the rotor body, securing a pair of spindles to respective ends of the rotor body, and securing ends of the winding module to the spindles so as to thereby secure the ends of the winding module to the rotor body.

DETAILED DESCRIPTION OF THE INVENTION

Figure 1:
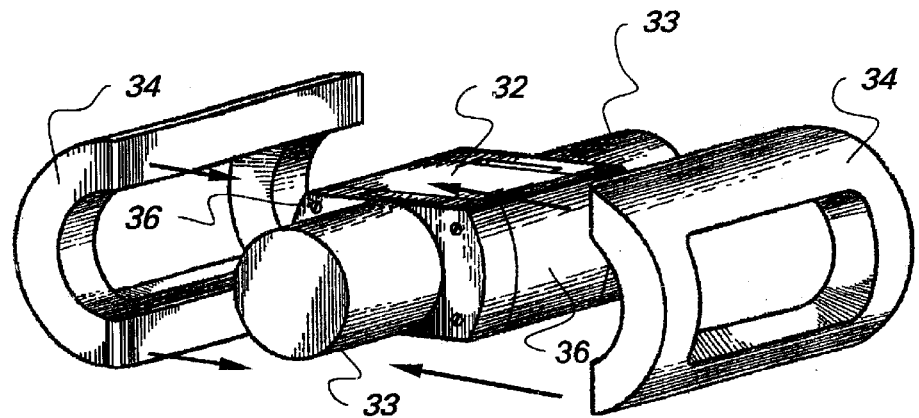
FIG. 1 illustrates a generator rotor assembly including a one-piece rotor forging and winding modules with two curved sides.

The rotor assembly of the noted co-pending U.S. patent application Ser. No. 09/491,504 is shown in FIG. 1. The assembly includes a multi-pole magnetic core 32 (two-pole core shown) including spindles 33 and receiving a plurality of winding assemblies 34, one for each pole. Corresponding pole faces 36 are provided at ends of the rotor forging. As shown by the arrows, winding assemblies 34 are slid over the parallel-sided forging of two-pole magnetic core 32. These winding assemblies 34 are curved into an arc concentric with spindles 33 to accommodate the spindles.

Figure 2:
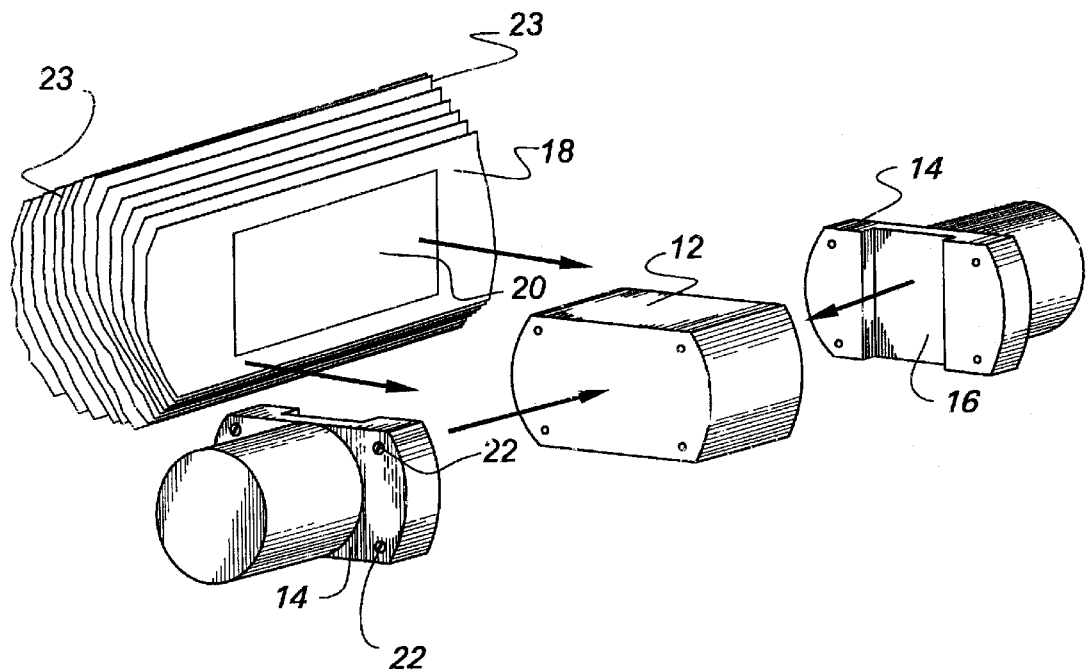
FIG. 2 is an assembly drawing of the generator rotor of the present invention.

FIG. 2 is an assembly drawing of the rotor of the present invention. As shown, the rotor forging is divided into at least three pieces including a rotor body 12 and a pair of generally tuning fork-shaped spindles 14. The so-shaped spindles 14 define notches 16 therein. A winding module 18 includes a plurality of abutting flat field windings joined end-to-end and having openings 20 sized to fit over rotor body 12. The abutting field windings are constructed in the same manner as conventional windings; however, as flattened field windings, they are easier to manufacture and configure, resulting in reliability and cost benefits. As shown, the flat field windings of winding module 18 have a smaller perimeter at outside ends of the winding module, tapering toward a largest perimeter at the middle of the winding module. This arrangement serves to maximize the winding space for greater magnetomotive force capability or lower resistance losses.

Winding module 18 is fitted over the parallel sides of rotor body 12 with spindles 14 separated from the rotor body. This portion of the rotor body thus forms a pair of magnetic poles. Once in place, spindles 14 are secured to the rotor body by screws, bolts, or threaded studs 22 or the like. Each notch 16 in the spindles is sized to receive the ends 23 of winding module 18. After fitting winding module 18 over the parallel sides of rotor body 12, spindles 14 are secured to rotor body 12 via screws 22 or the like. The spindles are of appropriate size so that their outside surfaces are substantially flush with the corresponding surfaces of rotor body 12.

Subsequently, the rotor assembly is contained within an enclosure (not shown) that incorporates provisions for retaining winding module 18 in place.

Using the teachings of the present invention, a winding module can be constructed using flat field windings, thereby facilitating manufacture of the windings and assembly of the rotor. The simplified construction results in more accurate and efficient manufacture, which leads to higher reliability.

While the invention has been described in connection with what is presently considered to be the most practical and preferred embodiments, it is to be understood that the invention is not limited to the disclosed embodiments, but instead is intended to cover various modifications and equivalent arrangements included within the spirit and scope of the appended claims.

What is claimed is:

1. A multi-pole electric machine rotor comprising:
   a rotor body having defined pole regions with pole faces and parallel sides adjacent the pole faces;
   a prefabricated winding module having sequentially abutting flat field windings, wherein said prefabricated winding module is fitted over the parallel sides of the rotor body; and a pair of spindles secured to respective ends of the rotor body and securing opposite sides of the winding module to the rotor body.

2. A machine rotor according to claim 1, wherein the spindles are secured to the rotor body with fasteners selected from the group consisting of bolts, screws and threaded studs.

3. A machine rotor according to claim 1, wherein each of the spindles includes a notch therein shaped to receive one side of the winding module.

4. A machine rotor according to claim 1, wherein the winding module is a single unit.

5. A machine rotor according to claim 1, wherein the winding module comprises a plurality of abutting flat field windings joined end-to-end and having openings therein sized to fit over the rotor body.

6. A machine rotor according to claim 5, wherein the flat field windings have a smaller perimeter at outside ends of the winding module, tapering toward a largest perimeter at the middle of the winding module.

7. For use with a multi-pole electric machine including a rotor and a stator, a rotor comprising:
   a rotor body having at least one pair of parallel sides;
   a prefabricated winding module having sequentially abutting flat field windings, wherein said prefabricated winding module is fitted about four sides of the rotor body, at least one pair of said sides being parallel to each other; and
   a pair of spindles secured to a second pair of sides of the rotor body and securing opposite sides of the winding module to the rotor body.

8. A rotor according to claim 7, wherein the spindles are secured to the rotor body with fasteners selected from the group consisting of bolts, screws and threaded studs.

9. A rotor according to claim 7, wherein each of the spindles includes a notch therein that is shaped to receive one of said opposite sides of the winding module, respectively.

10. A rotor according to claim 7, wherein the winding module is a single unit.

11. A rotor according to claim 7, wherein the winding module comprises a plurality of abutting flat field windings joined end-to-end and having openings therein that are sized to fit about the four sides of the rotor body.

12. A rotor according to claim 11, wherein the flat field windings have a smaller perimeter at outside ends of the winding module, tapering toward a largest perimeter at the middle of the winding module.

13. A method of constructing a generator rotor comprising:
   (a) providing a rotor body having at least one pair of opposite and parallel sides;
   (b) fitting a prefabricated winding module over the parallel sides of the rotor body so as to define a pair of poles, said prefabricated winding module having sequentially abutting flat field windings; and
   (c) securing a pair of spindles to a second pair of opposite sides of the rotor body so as to secure opposite sides of the winding module to the rotor body.

* * * * *